United States Patent Office 3,793,357
Patented Feb. 19, 1974

---

3,793,357
PROCESS FOR THE REDISTRIBUTION OF ALKYL-SILANES AND ALKYLHYDROSILANES
Harry R. McEntee, Waterford, N.Y., assignor to General Electric Company
No Drawing. Filed Oct. 20, 1972, Ser. No. 299,602
Int. Cl. C07f 7/08, 7/12
U.S. Cl. 260—448.2 P
14 Claims

ABSTRACT OF THE DISCLOSURE

A process for the efficient redistribution of alkylsilanes comprising contacting an alkylhalosilane with an alkylsilane in the presence of 1 to 15% by weight of the reaction ingredients of the catalyst aluminum chloride and a catalytic amount of a catalytic promoter of the formula $$R_k'''R_c''SiX_{4-c-k}$$

wherein the above formula R" is an aromatic radical of 6 to 15 carbon atoms selected from mononuclear aryl, binuclear aryl, aralkyl and alkaryl radicals, $c$ varies from 1 to 4 and $k$ varies from 0 to 2 and the sum of $c+k$ may be equal to 4, and X is halogen.

In the foregoing process, the presence of the aromatic silane enhances the yield obtained of the desired alkylsilane as well as shortens the reaction time for obtaining the maximum yield of the alkylsilane.

BACKGROUND OF THE INVENTION

The present invention relates to the redistribution and disproportionation of alkylhalosilanes and alkylhydrogenhalosilanes and more particularly the present process relates to the redistribution of alkylhalosilanes and alkylhydrogensilanes whereby the yield that is obtained in the redistribution reaction is enhanced by the presence of an aromatic-containing catalytic promoter.

Redistribution reactions of alkylhalosilanes and alkylhydrosilanes is well known in the art. For instance, the redistribution of chlorosilanes is discussed in Sauer Pat. 2,647,136.

One of the disadvantages of the process such as that of the Sauer patent, was that to obtain commercially acceptable yields of the desired alkylhalosilane product it was necessary to carry out the reaction at excessively high temperatures as well as the utilization of prolonged reaction times. As such, it was not possible to carry out such processes in a practical continuous manner but it had to be carried out in a more or less batch process which in some cases took as long as 20 to 30 hours before the desired amount of the desired reaction product was obtained.

One of the advances over this type of process was that disclosed in U.S. Pat. 2,786,861, where alkylchlorosilanes were distributed in the presence of a catalyst to obtain a desired redistributed alkylchlorosilane. Such redistribution reactions were carried out with a well known redistribution catalyst, aluminum chloride. However, it was found that such a reaction could be carried out at lower temperatures in an advantageous manner over the process of the Sauer patent, by the use of a catalytic promoter which catalytic promoter comprised a hydrogen silane. Although, this decreased the reaction time to a period in which the required redistribution could be carried out to a period as low as 8 to 12 hours, nevertheless, it was desired to even further reduce the reaction time by which the desired alkylhalosilane reaction product was to be obtained.

Another advantage of the process disclosed in U.S. Pat. 2,786,861, was that it also reduced reaction temperatures to temperatures below 250° C. However, one of the difficulties with this process is that the hydrosilane catalytic promoter because of its low boiling point was removed and contaminated the alkylhalosilane reaction products. Thus, it was highly desirable to utilize a catalytic promoter which would remain as a liquid or solid even at elevated temperatures, say, temperatures as high as 175° C. and thus would permit the desired alkylhalosilanes to be removed from the reaction mixture after the redistribution reaction had been carried out. Such removal of the desired reaction product should be carried out with simplicity instead of complex distillation procedures.

It was also desirable to have the catalytic promoter present as a separable liquid or solid in the reaction mixture since in this manner the process could be carried out continuously. In this way, the desired alkylhalosilane that was to be redistributed could be passed in contact with the catalytic promoter as well as the aluminum chloride catalyst and then removed from the reaction mixture.

Such a catalytic promoter was also highly desirable even in the redistribution of alkylhydrogensilanes since with such a catalytic promoter that would remain in the state of a liquid at elevated temperatures, the hydrogen silane reactants could be passed in contact with the catalytic promoter and the aluminum chloride catalyst and then removed from the reaction site redistributed as desired leaving behind and being uncontaminated by either the catalytic promoter or the aluminum chloride.

Accordingly, it is one object of the present invention to provide for an efficient process for redistributing and even disproportionating alkylhalosilanes by the use of an aromatic-containing catalytic promoter.

It is another object of the present invention to provide for an efficient process for producing high yields of redistributed hydrogensilanes by the utilization of an aromatic-containing catalytic promoter.

It is still another object of the present invention to provide a process in which there is provided a catalytic promoter which will enhance the yields obtained in the dedistribution reaction of alkylhalosilanes, wherein the catalytic promoter will remain as a liquid even at elevated temperatures.

It is an additional object of the present invention to provide a process for the redistribution reaction of alkylhydrosilanes where in said reaction there is utilized an aromatic-containing catalytic promoter which promotes high yields of the desired alkylhydrosilane reaction product and which aromatic-containing catalytic promoter remains as a liquid even at elevated temperatures.

These and other objects of the present invention are accomplished by means of the process set forth below.

SUMMARY OF THE INVENTION

In accordance with the present invention, there is provided a process for the efficient redistribution of alkylhalosilanes comprising contacting a silane of the formula, (1) $$R_aSiX_{4-a}$$

with a silane of the formula, (2) $$R_b'SiX_{4-b}$$

in the presence of 1 to 15% by weight of the reaction ingredients of aluminum chloride and a catalytic amount of a catalytic promoter of the formula, (3) $$R_k'''R_c''SiX_{4-c-k}$$

where R and R' are selected from alkyl radicals of 1 to 8 carbon atoms, $a$ is a whole number that varies from 1 to 3, $b$ is a whole number that varies from 1 to 4, R" is an aromatic radical of 6 to 15 carbon atoms selected from mononuclear aryl, binuclear aryl, aralkyl and alkaryl radicals, R''' is an alkyl radical of 1 to 8 carbon atoms, $c$ varies from 1 to 4, $k$ varies from 0 to 2 where the sum of $c+k$ may be equal up to 4, and X is halogen.

In the foregoing redistribution reaction, the catalytic promoter is preferably present at a concentration of 1 to 20 mole percent based on the reaction ingredients.

In a more preferred embodiment, the catalytic promoter is present at a concentration of 1 to 10 mole percent by weight of the reaction ingredients.

It should be specified that in Formula 1 that there is at least one alkyl group and at least one halogen group in the silane of that formula. In the silane of Formula 2, there is at least one akyl group and there may or may not be halogen present, preferably there is at least one halogen present. It should also be obvious that when redistributing the alkylsilane of Formula 1 with the alkylsilane of Formula 2, that the two compounds will vary from each other with respect to the number of alkyl groups present as well as to the number of halogen groups present unless it is desired to disproportionate one compound and then the compounds of Formulas 1 and 2 will have the same structure.

There is also provided by the present invention a process for the efficient redistribution of alkylhydrogensilanes comprising contacting a silane of the formula, (4) $\qquad R_d^3H_eSiX_{4-d-e}$ with a silane of the formula, (5) $\qquad R_f^4H_gSiX_{4-f-g}$ in the presence of 1 to 15% by weight of the reaction ingredients of aluminum chloride and a catalytic amount of a catalytic promoter of the formula, (3) $\qquad R_k'''R_c''SiX_{4-c-k}$ where $R'''$, $R''$, X and $c$, $k$ are as defined previously, where $R^3$ and $R^4$ are alkyl radicals of 1 to 8 carbon atoms, X is halogen, $e$ is a whole number that varies from 1 to 2, $d$ is a whole number that varies from 1 to 2, the sum of $d+e$ in Formula 3 be no more than 3, $f$ is a whole number that varies from 1 to 2, $g$ is a whole number that varies from 1 to 2, where the sum of $f+g$ may equal 4.

In this second type of redistribution reaction in the preferred embodiment the catalytic promoter is present at a concentration of 1 to 20 mole percent based on the reaction ingredients and in an even more preferred embodiment the catalytic promoter is present at a concentration of 1 to 10 mole percent by weight of the reaction ingredients.

In the reaction of the compounds of Formulas 4 and 5, it should be noted that Formula 4 has also within its scope compounds in which there is no halogen present. In Formula 4, the hydrogensilane compound must contain an alkyl group, a hydrogen atom and a halogen atom. The silane with which it is reacted must contain an alkyl group, at least one hydrogen atom and may or may not contain a halogen atom.

It should also be noted that it is within the broad scope of the present invention that a catalytic promoter of the present case may also be used in disproportionation reactions where a compound of Formula 1 or Formula 2 are reacted by themselves in a disproportionation reaction in the presence of 1 to 15% by weight of the reaction ingredients of aluminum chloride and a catalytic amount of a catalytic promoter of the aromatic-containing compound of Formula 3, as was discussed previously with respect to the redistribution reaction between the compounds of Formulas 1 and 2.

Whether a disproportion reaction is carried out or redistribution reaction is carried out, the same reaction conditions apply which were discussed above and which will be more fully discussed below.

DESCRIPTION OF THE PREFERRED EMBODIMENT

Among the alkyl radicals which R and R' may be are, for instance, methyl, ethyl, propyl, isopropyl, butyl, amyl, octyl and etc. Preferably, R and R' in Formulas 1 and 2 are lower alkyl radicals of 1 to 8 carbon atoms and more preferably lower alkyl radicals of 1 to 4 carbon atoms.

The radical X is preferably the halogen chlorine.

It should be noted that in the compounds of Formula 2, there may be no halogen atoms present. Thus, in reacting the compounds of Formula 1 with the compounds of Formula 2, although there must be an alkyl group present in both compounds, it is only necessary in one compound that there be a halogen atom present.

The preferred type of compounds of Formulas 1 and 2 which may be reacted together in a redistribution reaction and the preferred type of redistribution reaction are as follows $$Me_3SiCl + MeSiCl_3 \rightarrow 2Me_2SiCl_2$$

$$Me_4Si + MeSiCl_3 \rightarrow Me_3SiCl + Me_2SiCl_2$$

Compounds in which R and R' are alkyl radicals coming within the scope of Formulas 1 and 2, recited above, are, for instance, tetramethylsilane, methyltrichlorosilane, dimethyldichlorosilane, trimethylchlorosilane, triethylchlorosilane, tetraethylsilane, ethyltrichlorosilane, tripropylchlorosilane, diisopropyldichlorosilane, dibutyldichlorosilane, triisobutyldichlorosilane, amyltrichlorosilane, and etc. What is necessary in both compounds of Formulas 1 and 2, is that there be an alkyl group present. Optionally, there may be a halogen group and preferably a chlorine aotm present in the compounds of Formula 2. In the compounds of Formula 1, there must be at least one halogen atom present and particularly a chlorine atom present.

In the compounds of Formulas 4 and 5, $R^3$ and $R^4$ are alkyl radicals such as, for instance, methyl, ethyl, propyl, isopropyl, butyl, amyl, octyl and etc. and preferably lower alkyl radicals of 1 to 8 carbon atoms. More preferably, $R^3$ and $R^4$ are lower alkyl radicals of 1 to 4 carbon atoms. In the compounds of Formulas 4 and 5, X may represent any halogen but preferably represents chlorine. In both compounds, that is, the compounds of Formulas 4 and 5, there must be at least one alkyl group present in the compounds. Also, in the compounds of Formula 4, there must be at least one hydrogen atom present, although there may be as many as two hydrogen atoms present. However, the sum of $d$ and $e$ can be no more than 3, that is, in the compound of Formula 4, there must also be at least one halogen atom present and preferably a chlorine atom.

In the compound of Formula 5, there may or may not be a hydrogen atom present and there may or may not be a halogen atom present since the sum of $f+g$ may be equal up to 4. However, in the compound of Formula 5, there must be either a halogen atom present or a hydrogen atom present, although both a hydrogen atom and a halogen atom can be present. Of course, in the compounds of Formula 5, there is always present an alkyl group, that is, the $R^4$ group. It is, of course, understood that the structure of the compounds of Formulas 4 and 5 are different in order to carry out the proper redistribution reaction. Thus, while the compounds of Formula 5 may have a halogen atom present and do not need to have any hydrogen atoms present when they are redistributed with compounds of Formula 4, then the hydrogen atom of the compounds of Formula 4 may redistribute itself with the chlorine atom of the compounds of Formula 5. On the other hand, when the compound of Formula 5 has a hydrogen and does or does not have a chlorine atom and the compound of Formula 5 is redistributed with the compound of Formula 4, then an alkyl group or a chlorine group from the compound of Formula 4 may redistribute or rearrange itself with an alkyl group or hydrogen atom in the compound of Formula 5 to carry out the required redistribution reaction.

Desirable redistribution reactions when the compounds of Formulas 4 and 5 are reacted are as follows, $$Me_3SiCl + MeHSiCl_2 \rightarrow Me_2HSiCl + Me_2SiCl_2$$

$$2\ MeHSiCl_2 \rightarrow MeH_2SiCl + MeSiCl_3$$

Among compounds coming within the scope of Formulas 4 and 5 and which may be used in the redistribution reaction in accordance with the present invention are propyldichlorosilane, monochloropropylsilane, dimethylchlorosilane, methyldichlorosilane, trichlorosilane, butyldichlorosilane, propylchlorosilane, amylchlorosilane, trimethylsilane, ethyldichlorosilane and etc.

In the catalytic promoter of Formula 3, X is halogen and preferably chlorine. R''' is selected from lower alkyl radicals such as that defined for R and R'. R'' is selected from aromatic radicals such as, for instance, aryl radicals such as phenyl, tolyl, xylyl, biphenyl, naphthyl. More specifically, R'' may be selected from mononuclear aryl radicals such as, phenyl; from alkaryl radicals, for example, tolyl, xylyl, ethylphenyl and etc. radicals; aralkyl radicals, for example, benzyl, phenyl, ethyl and etc. radicals; and binuclear aryl radicals such as, for example, naphthyl. Preferably, the carbon atoms in the R'' radical varies anywhere from 6 to 15 carbon atoms.

It is critical in the catalytic promoter of the compound of Formula 3 that there be at least one aromatic radical in the molecule which may be any one of the aromatic radicals discussed previously for R''. Optionally, there may be present in the compound of Formula 3, either an alkyl radical, that is, R''', or a halogen atom or both. However, as pointed out previously, it is critical that there be present at least one aromatic radical in the compound of Formula 3, if it is to function in its proper capacity as a catalytic promoter in the process of the present invention.

The amount of aluminum trichloride or compounds of aluminum trichloride decomposable under the reaction conditions to aluminum trichloride employed in the reaction may be varied within very wide limits. Generally, the concentration of the aluminum trichloride may vary anywhere from a concentration of about 1 to 15% by weight based on the reaction ingredients excluding the catalytic promoter. More preferably, the concentration of the aluminum trichloride varies from a concentration of from 2 to 10% by weight based on the total weight of the reaction ingredients, excluding the catalytic promoter.

The only other necessary ingredient for the redistribution reaction process to be carried out in accordance with the present invention is the catalytic promoter of Formula 3. Generally, the catalytic promoter of Formula 3 may be present at a concentration of anywhere from .01 to 50 mole percent based on the amount of moles of the reaction ingredients excluding the aluminum trichloride catalyst. More preferably, the concentration of the catalytic promoter is from 1 to 20 mole percent based on the amount of moles of the reaction ingredients excluding the aluminum trichloride. In the most preferred embodiment, the catalytic promoter of Formula 3 is utilized in the redistribution reaction between the compounds of Formulas 1 and 2 or the compounds of Formulas 4 and 5 at a concentration of 1 to 20 mole percent based on the number of moles of the reaction ingredients excluding the aluminum trichloride. Although, as has been stated previously, as much as 50 mole percent of the catalytic promoter may be used, for most applications it is undesirable to use such a high concentration of the catalytic promoter since it is not economical. Also, in addition, although as little as .01 mole percent of the catalytic promoter may be utilized in the redistribution reaction of the process of the present invention such low concentration of the catalytic promoter does not promote the redistribution reactions in accordance with the present invention as much as would be desired. Accordingly, the preferred concentration of the catalytic promoter is anywhere from 1 to 20 mole percent and more preferably 1 to 10 mole percent based on the weight of the reaction ingredients excluding the weight of the aluminum trichloride.

It should be noted that the catalytic promoter of Formula 3 is a true catalytic promoter, that is, if the redistribution reaction is carried out in batch-wise fashion the same catalytic promoter, that is, the aromatic-containing silane of Formula 3 may be used in batch after batch with desirable high yields of the desired redistributed silane. By the utilization of the catalytic promoter of Formula 3 in the redistribution reactions between the compounds of Formulas 1 and 2 or the compounds of Formulas 4 and 5, the yield of the desired redistributed silane may be increased by as much as 20 to 30 mole percent over the case where no catalytic promoter is utilized. In fact, the catalytic promoter of the present case, that is, the aromatic-containing catalytic promoter of Formula 3, when used in the redistribution reaction of the compounds of Formulas 1 and 2 may result in a yield of the desired redistributed silane that may be 10 to 20 mole percent or higher than the yield that is obtained utilizing a hydrogen silane promoter such as the one disclosed in U.S. Pat. 2,786,861.

The compounds of Formulas 1 and 2 or Formulas 3 and 4 are reacted at a concentration of anywhere generally, 10 to 20 mole percent of one reactant and 10 to 90 mole percent of the other reactant and preferably at a concentration of 40 to 60 mole percent of one reactant and 40 to 50 mole percent of the other reactant.

The temperature at which the redistribution reaction may be carried out may be varied. Generally, there may be utilized a temperature as low as 50° C. and a temperature as high as 175° C. It is not desired to increase the redistribution reaction temperature in the reaction vessel in excess of 175° C. since then undesirable side reactions occur with the aromatic-containing silane of Formula 3. More generally, it is preferred to carry out the redistribution reaction anywhere at a temperature of 100 to 175° C. and at this tempeature the redistribution reaction either with the compounds of Formula 1 and Formula 2 or the redistribution reaction between the compounds of Formulas 4 and 5, will proceed efficiently and produce the desired redistributed silane in high yield.

The redistribution reaction, that is, the contacting of the compounds to be redistributed, that is, either the compounds of Formulas 1 and 2 or the compounds of Formulas 4 and 5, with the aluminum trichloride and the catalytic promoter of the present case may be carried out for periods as long as 8 to 12 hours at the preferred temperatures indicated. In most cases, it will be found that high yields of the desired redistributed silane can be obtained in periods of time as short as 2 to 6 hours.

It should also be noted that the temperature at which the reaction is caused to be carried out can be within the general range of 50 to 175° C. and the more preferred range of 100 to 175° C. will be very dependent upon such factors as the particular chlorosilanes, halogensilanes employed, the concentration of the aluminum trichloride, the catalyzed time of reaction, the amount of the catalytic promoter used, the presence or absence of pressure, and the concentration of the hydrosilanes. This variation of temperature is well within the ability of a worker skilled in the art.

The present process can be carried out at atmospheric pressure but it is advantageously carried out at super atmospheric pressure in order to effect more intimate contact between the various molecules and to maintain at least the catalytic promoter in the liquid phase and to repress sublimation of the aluminum trichloride.

In the temperature range employed in carrying out the reaction as specified above, pressures varying anywhere from 50 to about 500 p.s.i. are generally satisfactory. The use of higher reaction pressures is not precluded. More preferably, a pressure of 50 to 100 p.s.i.g. is preferred in the redistribution reactions of the present invention.

It should be noted that the redistribution reactions of the present invention may be carried out either in a batch, semi-continuous or continuous manner. Thus, since the catalytic promoter of Formula 3 is a liquid at the reaction temperatures that are utilized and taught in the present invention for the foregoing redistribution of either the compounds of Formulas 1 and 2 or the compounds of the Formulas 4 and 5, and since the aluminum trichloride is a solid at those temperatures, the reasons may simply be passed in the form of gases into contact with a catalytic promoter and the aluminum trichloride for the desired period of time and then taken out in the desired redistributed form. Thus, the introduction of the reactants to be redistributed into contact with a catalytic promoter and the aluminum trichloride as well as the removal of the reaction products may be carried out in a continuous manner by utilizing a column. The utilization of columns in order to carry out similar processes in a continuous manner is well known in the art. It is, of course, obvious that the present process can be carried out in batch-wise fashion and it is one of the outstanding advantages both for the batch-wise semi-continuous method or a continuous process that the catalytic promoter of the present case does not have to be replenished after each redistribution reaction but may be utilized for many redistribution reactions before it is necessary to replenish it.

In order that those skilled in the art may better understand how the present invention may be practiced, the following examples are given by way of illustration and not by way of limitation. All parts are by weight. In all the following examples unless stated otherwise the pressure equipment was a 2-gallon pressure reactor which was provided with suitable arrangements whereby the reactor together with the contents could be uniformly heated at elevated temperatures. All the reactions were conducted under substantially anhydrous conditions. The temperature and pressure condition were such that at least the catalytic promoter of Formula 3 was in the liquid phase where interaction took place.

EXAMPLE 1

To 1300 parts of trimethylchlorosilane, 1791 parts of methyltrichlorosilane and 572 parts of phenylmethyldichlorosilane, there were added 400 parts of aluminum chloride to the above-described reactor, and the vessel was sealed shut. The charged vessel was heated to 143° C. and kept at this temperature for five and one-half hours. The contents of the vessel were then analyzed and found to contain 77 mole percent of dimethyldichlorosilane.

EXAMPLE 2

To 1125 parts of trimethylchlorosilane, 1550 parts of methyltrichlorosilane and 930 parts of diphenyldichlorosilane, there was added 398 parts of aluminum chloride which were charged to the above-described reactor, and the vessel was sealed shut. The charged vessel was heated to 146° C. and kept at this temperature, and the contents of the reactor analyzed periodically with the following results:

| Time (mins.) | Mol percent* | | |
|---|---|---|---|
| | $Me_3SiCl$ | $MeSiCl_3$ | $Me_2SiCl_2$ |
| 0 | 46.9 | 48.8 | 2.0 |
| 25 | 38.4 | 48.1 | 8.8 |
| 55 | 18.5 | 38.6 | 39.3 |
| 85 | 7.8 | 20.3 | 68.3 |
| 115 | 5.6 | 13.4 | 78.5 |
| 175 | 5.7 | 13.2 | 78.0 |
| 415 | 4.9 | 11.8 | 79.5 |

*On a catalyst free basis.

EXAMPLE 3

To 3090 parts of dimethyldichlorosilane and 758 parts of diphenyldichlorosilane, there were added 399 parts of aluminum chloride which were charged to the above-described reactor and the vessel was sealed shut. The charged vessel was heated to 138° C. and kept at this temperature for one hour. The contents of the vessel were then analyzed and found to contain 3.6 and 3.4 mole percent of trimethylchlorosilane and methyltrichlorosilane, respectively. This example illustrates the disproportionation of dimethyldichlorosilane to form trimethylchlorosilane plus methyltrichlorosilane.

The following two examples are used to demonstrate the acceleration of the redistribution reactions by addition of a phenyl-silicon bond containing silane to a reaction mix containing hydrogen-silicon bond containing silanes.

EXAMPLE 4

To 1139 parts of trimethylchlorosilane, 1568 parts of methyltrichlorosilane, 510 parts of methyldichlorosilane, 380 parts of diphenyldichlorosilane, there were added 398 parts of aluminum chloride which were charged to the above-described reactor, and the vessel was sealed shut. The charged vessel was heated to 146° C. and kept at this temperature. The contents of the reactor were analyzed periodically with the following results.

| Time (mins.) | Mole percent* | | | | | |
|---|---|---|---|---|---|---|
| | $MeH_2SiCl$ | $Me_2HSiCl$ | $MeHSiCl_2$ | $Me_3SiCl$ | $MeSiCl_3$ | $Me_2SiCl_2$ |
| 0 | 0 | 0 | 12.7 | 38.3 | 47.2 | 1.1 |
| 25 | 0.58 | 0.18 | 9.5 | 38.1 | 45.1 | 3.2 |
| 60 | 0.47 | 1.26 | 7.6 | 12.1 | 19.8 | 56.3 |
| 86 | 0.43 | 1.58 | 7.0 | 4.3 | 12.9 | 72.4 |
| 110 | 0.36 | 1.78 | 6.6 | 4.3 | 12.5 | 73.5 |
| 150 | 0.35 | 1.64 | 6.6 | 3.9 | 12.9 | 73.3 |

*On a catalyst free basis.

EXAMPLE 5

To 1279 parts of trimethylchlorosilane, 1763 parts of methyltrichlorosilane and 572 parts of methyldichlorosilane, there were added 400 grams of aluminum chloride which were charged to the above-described reactor, and the vessel was sealed shut. The charged vessel was heated to 146° C. and kept at this temperature. The contents of the reactor were analyzed periodically with the following results. In this example no phenyl-silicon bond containing silane is present, and the example serves for comparison with the results of Example 4.

| Time (mins.) | Mole percent* | | | | | |
|---|---|---|---|---|---|---|
| | $MeH_2SiCl$ | $Me_2HSiCl$ | $MeHSiCl_2$ | $Me_3SiCl$ | $MeSiCl_3$ | $Me_2SiCl_2$ |
| 0 | 0 | 0 | 12.7 | 41.1 | 44.0 | 2.1 |
| 18 | 0 | 0 | 10.9 | 41.2 | 45.4 | 2.5 |
| 45 | 0 | 0 | 11.7 | 26.9 | 32.6 | 28.9 |
| 75 | 0.34 | 0.37 | 11.8 | 15.2 | 23.8 | 48.6 |
| 100 | 0.43 | 0.76 | 8.6 | 11.0 | 19.7 | 59.5 |
| 135 | 0.48 | 1.04 | 9.1 | 10.4 | 17.4 | 61.6 |
| 195 | 0.40 | 1.09 | 6.9 | 7.8 | 14.9 | 68.9 |
| 314 | 0.36 | 1.30 | 6.8 | 5.6 | 14.1 | 71.9 |

*On a catalyst free basis.

Comparison of the results of Examples 4 and 5 shows that redistribution to form dimethyldichlorosilane is accelerated by the addition of the phenyl-silicon bond containing silane. In Example 4, the concentration of dimethyldichlorosilane is 72.4% after 86 minutes whereas in Example 5 the concentration is only 59.5% after 100 minutes. Similarly, comparison shows that redistribution to form dimethylchlorosilane (Me$_2$HSiCl) is accelerated. In Example 4, the concentration of dimethylchlorosilane is 1.58% after 86 minutes whereas in Example 5 the concentration is only 0.76% after 100 minutes. Comparison also shows that redistribution to form methylchlorosilane (MeH$_2$SiCl) is accelerated. In Example 4, the concentration of methylchlorosilane is 0.58% after 25 minutes whereas in Example 5 no methylchlorosilane was found to be present after 45 minutes.

I claim:

1. A process for the redistribution of alkylsilanes comprising contacting a silane of the formula, $$R_a SiX_{4-a}$$

with a silane of the formula, $$R_b' SiX_{4-b}$$

in the presence of 1 to 15% by weight of the reaction ingredient of AlCl$_3$ and a catalytic amount of a catalytic promoter of the formula, $$R_k''' R_c'' SiX_{4-c-k}$$

where R and R' are selected from alkyl radicals of 1 to 8 carbon atoms, $a$ is a whole number that varies from 1 to 3, $b$ is a whole number that varies from 1 to 4, R'' is an aromatic radical of 6 to 15 carbon atoms selected from mononuclear aryl and alkaryl radicals, R''' is an alkyl radical of 1 to 8 carbon atoms, $c$ varies from 1 to 3, $k$ varies from 0 to 2 and the sum of $c+k$ may be up to 4, and X is halogen.

2. The process of claim 1, wherein said catalytic promoter is present at a concentration of 1 to 20 mole percent based on the reaction ingredients.

3. The process of claim 2, wherein the catalytic promoter is present at a concentration of 1 to 10 mole percent by weight of the reaction ingredients.

4. The process of claim 1, wherein the ingredients are contacted at a temperature in the range of 100 to 175° C.

5. The process of claim 4 wherein the ingredients are contacted for a period of time varying from 2 to 6 hours.

6. The process of claim 1 which is carried out in a continuous manner.

7. The process of claim 1, wherein it is carried out at a pressure of 50 to 500 p.s.i.g.

8. A process for the redistribution of alkylhydrosilanes comprising contacting a silane of the formula, $$R_d^3 H_e SiX_{4-d-e}$$

with a silane of the formula, $$R_f^4 H_g SiX_{4-f-g}$$

in the presence of 1 to 15% by weight of the reaction ingredients of AlCl$_3$ and a catalytic amount of a catalytic promoter of the formula, $$R_k''' R_c'' SiX_{4-c-k}$$

where R$^3$ and R$^4$ are alkyl radicals of 1 to 8 carbon atoms, $e$ is a whole number that varies from 1 to 2, $d$ is a whole number that varies from 1 to 2, the sum of $d+e$ being no more than 3, $f$ is a whole number that varies from 1 to 2, $g$ is a whole number that varies from 0 to 2, where the sum of $e+f+g$ may equal up to 4, R''' is an alkyl radical of 1 to 8 carbon atoms, R'' is an aromatic radical of 6 to 15 carbon atoms selected from mononuclear aryl, and alkaryl radicals, $c$ varies from 1 to 4, $k$ varies from 0 to 3 and the sum of $c+k$ may be up to 4, and X is halogen.

9. The process of claim 8, wherein said catalytic promoter is present at a concentration of 1 to 20 mole percent based on the reaction ingredients.

10. The process of claim 9, wherein said catalytic promoter is present at a concentration of 1 to 20 mole percent by weight of the reaction ingredients.

11. The process of claim 8, wherein the ingredients are contacted at a temperature in the range of 100° to 175° C.

12. The process of claim 11, wherein the ingredients are contacted for a period of time varying from 2 to 6 hours.

13. The process of claim 8 which is carried out in a continuous manner.

14. The process of claim 8, wherein the process is carried out at a pressure of 50 to 500 p.s.i.g.

References Cited

UNITED STATES PATENTS

| | | | |
|---|---|---|---|
| 2,786,861 | 3/1957 | McEntee | 260—448.2 P |
| 3,557,176 | 1/1971 | Bazouin et al. | 260—448.2 P |
| 3,655,710 | 4/1972 | Bazouin et al. | 260—448.2 P |
| 2,730,540 | 1/1956 | Sauer | 260—448.2 P |

DANIEL E. WYMAN, Primary Examiner

P. F. SHAVER, Assistant Examiner